United States Patent Office 2,914,962
Patented Dec. 1, 1959

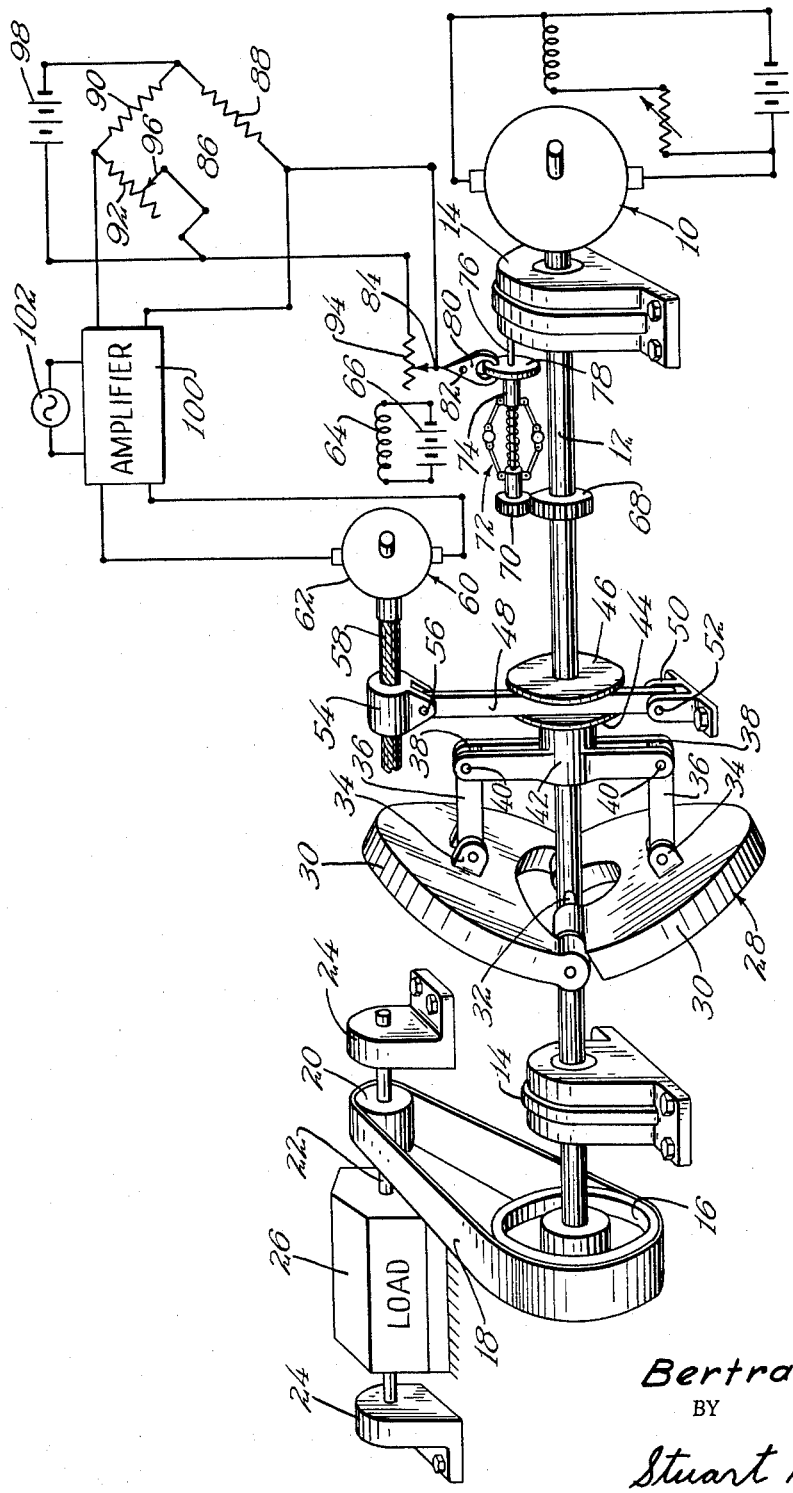

2,914,962

FLYWHEEL SYSTEM

Bertram A. Schmidt, Minneapolis, Minn.

Application December 27, 1956, Serial No. 630,980

4 Claims. (Cl. 74—572)

This invention relates in general to flywheels and pertains more particularly to a flywheel system in which the flywheel mechanism is adjustable so that kinetic energy may be stored and released as circumstances dictate.

Flywheels have long been used in drive systems of various types where either the load varies or the power input fluctuates. As is well known, the mass of a conventional flywheel will absorb energy with an increase in velocity and gives out energy with a decrease in velocity. While the ordinary flywheel has a stabilizing effect, there are many instances where such a flywheel will not act fast enough. Also, the customary flywheel cannot be utilized as a means of varying the speed of the drive system.

Accordingly, one important object of the present invention is to provide an adjustable flywheel mechanism having revolving weight members which may be moved radially inwardly and outwardly relative to their axis of rotation, thereby permitting control of the release and absorption of kinetic energy to and from the overall drive system. More specifically, it is an aim of the invention to control the speed of the system, either to maintain a relatively constant speed or to adjust the system to a different speed.

It is a feature of the invention to achieve the foregoing objective independently of the power being delivered to the drive system. For instance, in a power drive system where the input power is limited or relatively constant my flywheel arrangement will permit the system to be maintained at a substantially constant speed even though the load may at times vary considerably. On the other hand, my flywheel system will find utility in a drive where the input power may fluctuate rather widely or even be available on an intermittent or irregular basis. Still further, it is contemplated that in some drive installations neither the input power or the connected load will be uniform. My flywheel construction with its envisaged control of the position of the weight members will also lend itself readily to employment in this latter type of situation. Consequently, it will be recognized by those persons confronted with various machine design problems that my flywheel system is susceptible of practical use in various mill drive applications, punching and shearing operations, pump installations and vehicular propulsion, especially where the vehicle receives power only at strategically located stations, as it does in certain foreign countries. Of course, other types of drives could be included and those drives specifically referred to are only illustrative.

Another object of the invention is to provide a flywheel mechanism that will be simple in character and inexpensive to manufacture and maintain.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

The single figure is a schematic representation, largely in perspective, of a flywheel system exemplifying my invention.

Referring now in detail to the drawing a motor 10 serves as the driving means for a shaft 12 which is journaled for rotation by a pair of bearings 14. At the end of the shaft 12 opposite the motor 10 is a pulley or drum 16 about which is entrained an endless belt 18, the belt driving a driven pulley or drum 20. The drum 20 is mounted on a shaft 22 which is rotatably supported by a second pair of bearings 24. Directly connected to the shaft 22 is a load device or driven means 26 which may assume any one of a number of practical forms. For instance, the load 26 may be a vehicle, pump, ore crusher, rolling mill or almost any other piece of apparatus the speed of which is to be controlled in a manner hereinafter set forth.

Of prime importance to the system described above is a variable flywheel mechanism designated generally by the reference numeral 28. In the illustrated system the flywheel mechanism includes a pair of weight members 30 that are pivotally supported with respect to the shaft 12 by a transverse pin 32. By virtue of this pivotal support the mass of the members 30 may be adjusted in a radial direction relative to their axis of rotation, that is, the shaft 12 in this instance.

To permit radial adjustment of the weight members 30 while they are rotating, each member 30 is provided with a pair of ears 34. A pin 36 extends through each pair of ears 34 and one end of a link element 36. The other end of each link element 36 has pivotal connection with a radially projecting set of arms or spokes labeled 38 by means of a pin 40. The arms 38 form an integral part of a slidable collar or yoke 42 which freely circumscribes the shaft 12 in order to permit sliding movement of the yoke relative to the shaft. Also formed on the yoke is a pair of spaced flanges 44 and 46.

Through the agency of a pivotal lever arm 48, rendered so by a pair of fixedly disposed ears 50 and a pin 52 passing therethrough as well as the lower end of said arm, the yoke 42 may be shifted axially along the shaft to position the weight members 30 neither closer to nor farther away from the shaft 12. While in some installations the lever arm 48 may be pivoted manually, it is within the contemplation of the invention to perform this task by motive power. Assisting in this aim is a clevis element 54 pivotally attached to the upper end of the arm 48 by means of a pin 56.

The clevis element 54 is provided with a threaded bore for the accommodation of the threaded end of a shaft 58. The shaft 58 is rotated in either direction by a motor 60. For the purpose of illustrating the invention it will be assumed that the motor is a reversible D.-C. one, having an armature 62 and a field 64. The field 64 is separately excited by a power supply, such as a battery 66, whereas the excitation furnished to the armature 62 is controlled in a manner more fully dealt with below.

For the purpose of controlling the motor 60 in dependence upon the rotative speed of the shaft 12 and hence the load 26 a first gear 68 is mounted on said shaft. This gear 68 is in mesh with a driven gear 70. The gear 70 operates a conventional centrifugal governor designated generally by the numeral 72. The governor 72, depending upon its rotative speed, will position a sleeve 74 axially along a guide rod 76. Formed on the sleeve 74 is a flange 78 engaged by a bifurcated follower 80 pivotally mounted on a fixedly located pin 82. The follower 80 is equipped with a wiper or contact arm 84 at its upper end.

Coacting with the wiper arm 84 is an electrical bridge 86 of the Wheatstone variety, the bridge including a pair of fixed resistors 88 and 90, a first adjustable resistor 92 and a second adjustable resistor 94. The first adjustable resistor 92 is engaged by a manually actuated contact arm 96 and the second adjustable resistor is automatically wiped by the arm 84. A battery 98 functions as a source of power for the bridge.

Inasmuch as the bridge is intended to handle relatively small amounts of current and correspondingly small changes in voltage drops across the ratio resistors 88, 90, 92 and 94 an appropriate means of amplifying any output voltages is planned. The amplifier appears only in block form and has been given the reference numeral 100. A relatively wide choice of amplifiers is to be found and the amplifier 100 therefore need not be described in detail. However, it may be stated that a magnetic amplifier, such as that illustrated in U.S. Patent 2,622,239, granted December 16, 1952 to Michael Bracutt, might be selected. The amplifier 100, therefore, is energized from an A.-C. source 102, suitable rectification then being accomplished as shown in said patent. In order to cause reversal of the motor 60, it will be obvious that the amplifier should be both polarity and magnitude responsive.

The operation of my flywheel system will be readily apparent from the foregoing description. Assuming first, however, that the load 26 should be operated at substantially a constant speed, with a constant power input by the drive motor 10 and a uniform load at 26 there are no forces acting which would change the speed. However, supposing that the load is suddenly increased in magnitude, such an occurrence will drag down the speed of the shafts 22 and 12 as well as the motor 10, since they are all mechanically coupled together. It is at this moment that additional energy is required. This energy is received by the load 26 through the repositioning of the weight members 30, it being required that these members be moved to a position in which their respective masses are more closely adjacent the shaft 12.

This is automatically accomplished by virtue of the governor 72 slowing down and upsetting the electrical balance of the bridge 86 due to the change of resistance introduced by movement of the contact arm 84. Such a change will product an error signal having a particular polarity and magnitude which is delivered to the amplifier 100. The output from the amplifier is of a polarity and magnitude such as to cause operation of the motor 60 in a direction to thereby cause the lever arm 48 to pressurally bear upon the flange 46 to pull the yoke 42 to the right with the concomitant pulling of the weight members 30 inwardly with respect to the shaft 12, for instance, to the position actually pictured. Movement of the weight members 30 radially inwardly will compel them to release some of their stored kinetic energy to the shaft 12 and hence to the direct connected load 26. This action takes place without having to supply an increased amount of electrical input power to the motor 10. In this regard it may be explained that there may be many occasions where the motor 10, whether it be an electrical motor, internal combustion engine or other such device, is operating at peak power output, or where the power supply is limited, or for some other reason is difficult to change. Of course the converse of the above is also true, for the weight members 30 can equally well be moved outwardly to absorb kinetic energy from the system and thereby keep the load 26 from accelerating.

The preceding operational sequence has been concerned with the maintenance of a desired speed. It is also within the purview of the invention to vary the speed of the load 26 to suit encountered conditions. If a sudden speed increase is required, then the resistor 92 is merely adjusted to a new value by manually controlling the wiper arm 96. The wiper arm 84 under the influence of the governor 72 will then be repositioned so as to produce a null balance of the bridge 86 at the new speed.

Thus it will be recognized that the speed of the load 26 may be suddenly varied, either up or down, by changing the location of the weight members 30. If the arm 96 is then left in its new position, the new speed will thereafter be maintained. This action is of course obtained without the need of varying the input power to the motor 10. Also, should the power to the motor 10 be fluctuating, as by voltage dips if the motor 10 is electrical, any change in the speed of the motor 10 is literally ironed out by virtue of the automatic repositioning of the weight members 30.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A flywheel system comprising driving means, driven means, shaft means connecting said driven means to said driving means, means for producing a signal indicative of the speed of said shaft means, a pair of weight members constrained for rotation at varable but equal radii about a given axis for absorbing kinetic energy from and releasing kinetic energy to said shaft means, motor means for positioning said weight members inwardly and outwardly relative to said axis of rotation, and means responsive to said signal for actuating said motor means to cause said weight members to be moved in a direction to transfer energy between said weight members and said shaft means in a direction such as to maintain the speed of said shaft means substantially constant.

2. A flywheel system in accordance with claim 1 including means for actuating said motor means independently of said last-mentioned means to cause said weight members to be moved to a different but equal radial position thereby to change the speed of said shaft means to a different speed.

3. A flywheel system comprising driving means, driven means, shaft means connecting said driven means to said driving means, a pair of weight members constrained for rotation at variable but equal radii about a given axis for absorbing kinetic energy from and releasing kinetic energy to said shaft means, motor means for positioning said weight members inwardly and outwardly relative to said axis of rotation, an electrical bridge including a pair of fixed resistors and a pair of variable resistors constituting the various legs of said bridge, a centrifugal governor for controlling the resistance of one of said variable resistors in accordance with the speed of said shaft means, a power source connected to the input terminals of said bridge, an amplifier connected to the output terminals of said bridge, said amplifier supplying power to said motor means to cause said weight members to be moved outwardly or inwardly relative to their axis of rotation depending upon the direction in which said motor means is actuated.

4. A flywheel system in accordance with claim 3 in which the other of said variable resistors is employed to change the speed of said shaft means.

References Cited in the file of this patent

UNITED STATES PATENTS

| | | |
|---|---|---|
| 235,876 | Jay | Dec. 28, 1880 |
| 1,185,316 | Herr | May 30, 1916 |
| 1,684,132 | Hewlett et al. | Sept. 11, 1928 |
| 1,706,678 | Pangburn | Mar. 26, 1929 |
| 2,412,605 | Drake | Dec. 14, 1946 |

UNITED STATES PATENT OFFICE
CERTIFICATE OF CORRECTION

December 1, 1959

Patent No. 2,914,962

Bertram A. Schmidt

It is hereby certified that error appears in the printed specification of the above numbered patent requiring correction and that the said Letters Patent should read as corrected below.

Column 2, line 43, for "neither closer to nor" read -- either closer to or --; column 3, line 43, for "product" read -- produce --.

Signed and sealed this 16th day of August 1960.

(SEAL)
Attest:
KARL H. AXLINE
Attesting Officer

ROBERT C. WATSON
Commissioner of Patents